United States Patent
Childs et al.

(10) Patent No.: US 7,743,240 B2
(45) Date of Patent: Jun. 22, 2010

(54) APPARATUS, METHOD AND PROGRAM PRODUCT FOR POLICY SYNCHRONIZATION

(75) Inventors: Philip Lee Childs, Raleigh, NC (US); Charles Burnham Oxrieder, Wake Forerst, NC (US); David Rivera, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 670 days.

(21) Appl. No.: 11/695,095

(22) Filed: Apr. 2, 2007

(65) Prior Publication Data

US 2008/0244248 A1    Oct. 2, 2008

(51) Int. Cl.
G06F 15/177    (2006.01)

(52) U.S. Cl. .......................................... 713/1; 713/100

(58) Field of Classification Search ...................... 713/1, 713/2, 100
See application file for complete search history.

(56) References Cited

U.S. PATENT DOCUMENTS

| | | | |
|---|---|---|---|
| 6,678,712 B1 * | 1/2004 | McLaren et al. ............. 718/100 |
| 7,131,026 B2 * | 10/2006 | Denninghoff et al. .......... 714/6 |
| 2002/0053044 A1 * | 5/2002 | Gold et al. ..................... 714/38 |
| 2007/0074063 A1 * | 3/2007 | Mondshine et al. ............ 714/4 |

* cited by examiner

Primary Examiner—Dennis M Butler
(74) Attorney, Agent, or Firm—Patrick J. Daugherty; Driggs, Hogg, Daugherty & Del Zoppo Co., LPA

(57) ABSTRACT

Applications which function under a first operating system also function when it becomes necessary to call into action a second operating system due to provision having been made for configuration and other settings necessary to the execution of such applications (here generically called policy settings or policy source data) to be made available to the second operating system.

21 Claims, 3 Drawing Sheets

APPARATUS, METHOD AND PROGRAM PRODUCT FOR POLICY SYNCHRONIZATION

FIELD AND BACKGROUND OF INVENTION

It is known to operate computer systems with multiple operating systems. In particular, it is common place to provide systems with a so-called "dual boot" capability. Oftentimes, in providing dual boot capability, the multiple operating system function entirely independently one of another.

It is also known to provide for the capability of shifting to a second operating system should there be some failure in the operation of a first operation system. What has been known as the Lenovo rescue and recovery capability is one such implementation. In such an implementation, a system has first and second operating systems stored accessibly to the system and can move from the first to the second either automatically on certain identified failures of the first operating system or at the selection of a user of the system in other circumstances. In commercially available implementations of such operating systems, Microsoft products have been used, such as a Windows XP or other primary operating system as the first and a Windows PE or embedded system as the second.

Regardless of whether Microsoft products or other operating systems are used as the first and second operating systems, a problem is presented in assuring that applications which function under the first operating system also function under the second operating system. This can be important in restoring the functionality of a system, where application programs other than the operating system must be used to correct faults in system configuration or operations which may have caused the failure of the first operating system.

SUMMARY OF THE INVENTION

With the foregoing in mind, one purpose of this invention is to assure that applications which function under a first operating system will also function when it becomes necessary to call into action a second operating system. In realizing this purpose, provision is made for configuration and other settings necessary to the execution of such applications (here generically called policy settings or policy source data) to be made available to the second operating system.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which one implementation of the present invention is illustrated, it is to be understood at the outset of the description which follows that persons of skill in the appropriate arts may modify the invention here described while still achieving the favorable results of the invention. In particular, several implementations of the invention are described below. Accordingly, the description which follows is to be understood as being a broad, teaching disclosure directed to persons of skill in the appropriate arts, and not as limiting upon the present invention.

Figure 1:
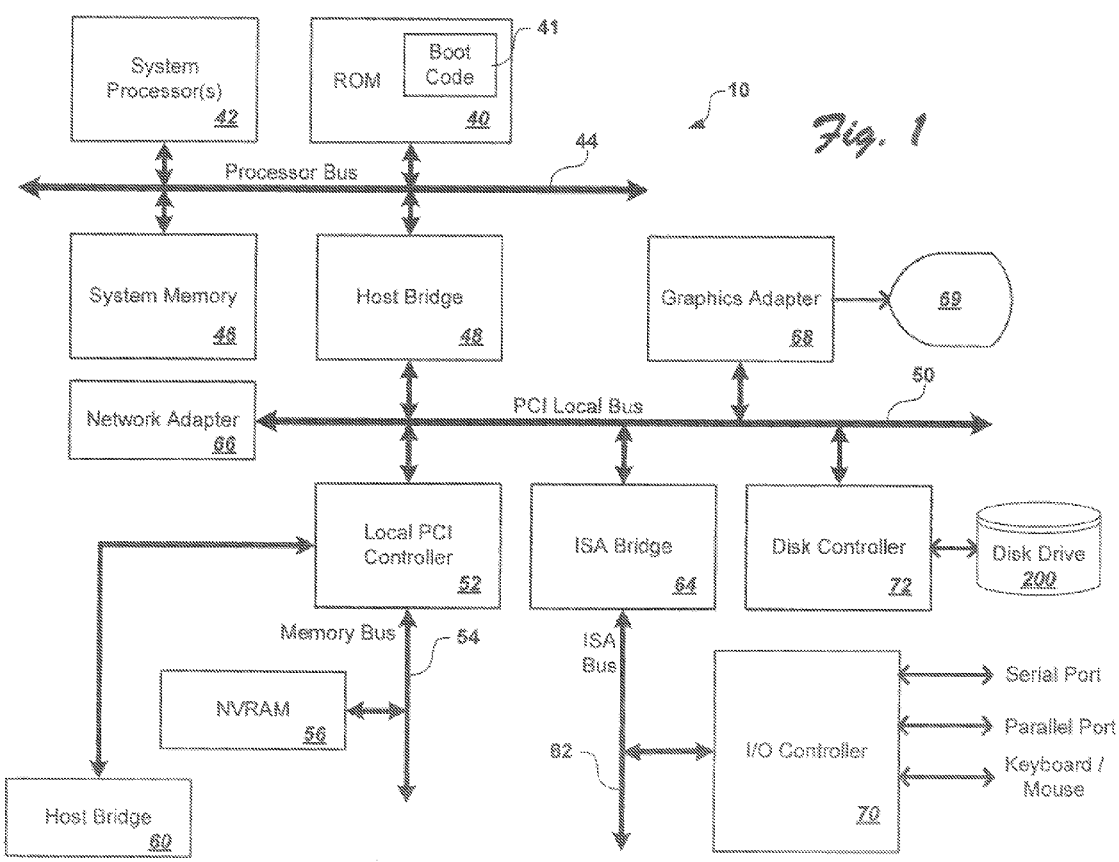
FIG. 1 is a representation of a computer system in which the present invention is implemented.

Referring now to FIG. 1, a computer system 10 is there shown in which the present invention may be implemented. The illustrative embodiment depicted in FIG. 1 may be a desktop or notebook computer system, such as one of the ThinkCentre® or ThinkPad® series of personal computers from Lenovo, or a workstation computer; however, as will become apparent from the following description, the present invention is applicable to any data processing system.

As shown in FIG. 1, computer system 10 includes at least one system central processor unit 42, which is coupled to a Read-Only Memory (ROM) 40 and a system memory 46 by a processor bus 44. System processor 42, which may comprise one of the PowerPC™ line of processors produced by IBM Corporation, is a general-purpose processor that executes boot code 41 stored within ROM 40 at power-on and thereafter processes data under the control of operating system and application software stored in system memory 46. As persons of skill will recognize, the processor 42 may be obtained from a number of other suppliers. System processor 42 is coupled via processor bus 44 and a host bridge 48 to a Peripheral Component Interconnect (PCI) local bus 50.

PCI local bus 50 supports the attachment of a number of devices, including adapters and bridges. Among these devices is a hard disk drive 200 coupled through a disk controller 72, a network adapter 66 which interfaces the computer system 10 to a LAN or the like, and a graphics adapter 68, which interfaces computer system 10 to a display 69. The ROM 40, system memory 46 and disk drive 200 together provide a digital memory for the computer system 10 in which data of various sorts is stored accessibly to the central processor unit 42. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 10 further includes an Industry Standard Architecture (ISA) bus 62, which is coupled to PCI local bus 50 by ISA bridge 64. Coupled to ISA bus 62 is an input/output (I/O) controller 70, which controls communication between computer system 10 and attached peripheral devices such as a keyboard, mouse, and other disk drives. In addition, I/O controller 70 supports external communication by computer system 10 via serial and parallel ports.

Figure 2:
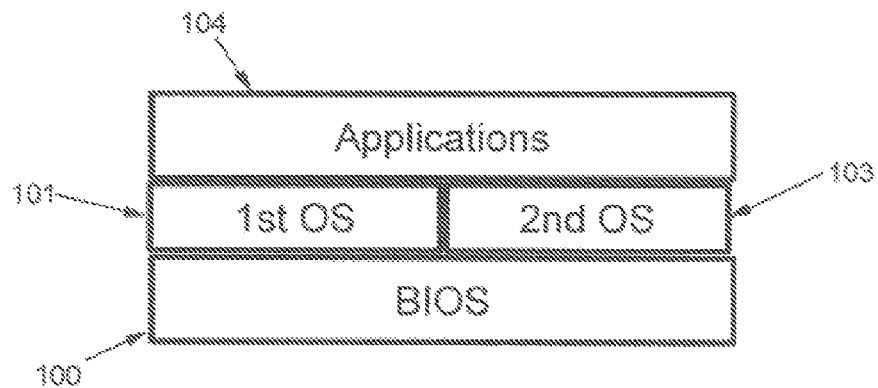
FIG. 2 is a schematic representation of a software stack present in a computer system in which this invention is implemented.

FIG. 2 illustrates a software stack which is stored accessibly to the processor 42 and functions within the computer system 10. The software stack includes a BIOS level 100, a first operating system 101, a second operating system 103, and applications 104. While illustrated as a single block for convenience, persons of skill in the arts will know that many applications are typically made available.

The operating system chosen as the first operating system may be a Microsoft product from among the Windows family intended for use as the primary operating system in a computer system of the type here described. The Windows operating systems have evolved over time through the initial Windows product, Windows 95, Windows 98, Windows 2000, Windows XP and Windows Vista. The operating system chosen as the first operating system may also chosen from other available operating systems, such as the versions of Linux distributed by various vendors including RedHat, Suse, and others or versions of Unix. It is contemplated by this invention that the first operating system be stored accessibly to the central processing unit 42 and effective when executing on the central processing unit to store in the digital memory 40, 46, 200 policy source data identifying configuration settings. Such policy source data identifies to application programs executing on the central processing unit the system resources—hardware and software—which are needed for execution of the application programs. Where Microsoft operating systems are used, such policy source data may be referred to a registry data. Where other operating systems are implemented, the terminology may be different while the essential functionality is the same. For purposes of this invention, it is the functionality that is important rather than the specific terminology used by the operating system authors.

In accordance with this invention, the first operating system is effective when executing on the central processing unit to store in the digital memory policy source data identifying configuration settings. A program element effective while the system is under the control of the first operating system monitors stored policy source data and exports monitored policy source data to storage in a predetermined location in the digital memory. In a Windows environment, such monitoring and storage may be under the direction of a program element known as a service. The terminology which identifies such a program as a service was a choice of the authors of the Windows products, and other terminology may be used or may have been used by the authors of other operating systems. What is significant here is that a capability is present for monitoring and storing at least portions of the configuration data in a predetermined location of the digital memory.

It is contemplated that this capability may be exercised in a number of ways. The monitoring and storing may proceed automatically and outside the knowledge of a user each time the system is started, rebooted, shut down or a user logs on. The monitoring and storing may proceed at the initiation of the user or an administrator having remote access to system functions. The monitoring and storing may proceed automatically at predetermined time intervals, with or without notice to the user that the function is being exercised and with or without the user determining the intervals at which the program element will execute. The monitoring and storing may proceed upon certain defined applications being called by a user. Any one, combination or all of these triggering events may be implemented in determining the best use of the invention in specific environments.

It is contemplated that the data exported will be stored in a particular predetermined data format, which may be different from that normally used by the first operating system, and stored in a location normally hidden from the view of a user of the system and not directly or easily accessible to the user. Preferably, the location is on the hard disk drive 200 or some other hard disk drive accessible to the system 10 either by connection to one of the busses or through the LAN connection.

In order to facilitate execution of one or more applications normally stored accessibly to the central processing unit, as may be desired in the event of an occurrence while the system is under the control of the first operating system, a second operating system is stored accessibly to the central processing unit and may be called to control the central processing unit under defined circumstances. These circumstances may be involuntary and triggered by some failure of the first operating system or voluntary at the decision of a user of the system.

The second operating system may be called to execute in a virtualization mode. In any event, the second operating system accesses the policy source data stored in the predetermined location to enable the execution of at least one application while the system is under the control of the second operating system. Preferably, the computer system 10 includes a program element in the form of an application executing under the second operating system which imports the policy source or registry data to be used by applications executing under the second operating system. That importation application executes first when the second operating system is called.

As with the monitoring and storing capability, the importation capability may be exercised in a number of ways. The importation may proceed automatically and outside the knowledge of a user each time the system is started, rebooted, shut down or log on or off of a user. The importation may proceed at the initiation of the user or an administrator having remote access to system functions, possibly for the purpose of assisting in a repair. The importation may proceed automatically at predetermined time intervals, with or without notice to the user that the function is being exercised and with or without the user determining the intervals at which the program element will execute. The importation may proceed upon certain defined applications being called by a user. Any one, combination or all of these triggering events may be implemented in determining the best use of the invention in specific environments.

In a specific, non-limiting, example of a system in which a Windows operating system such as Windows XP is the first operating system and Windows PE is the second operating system, as Windows PE is called an application executes which imports into Windows PE at least one registry data file enabling an application which otherwise executes under Windows XP to execute under Windows PE.

Figure 3:
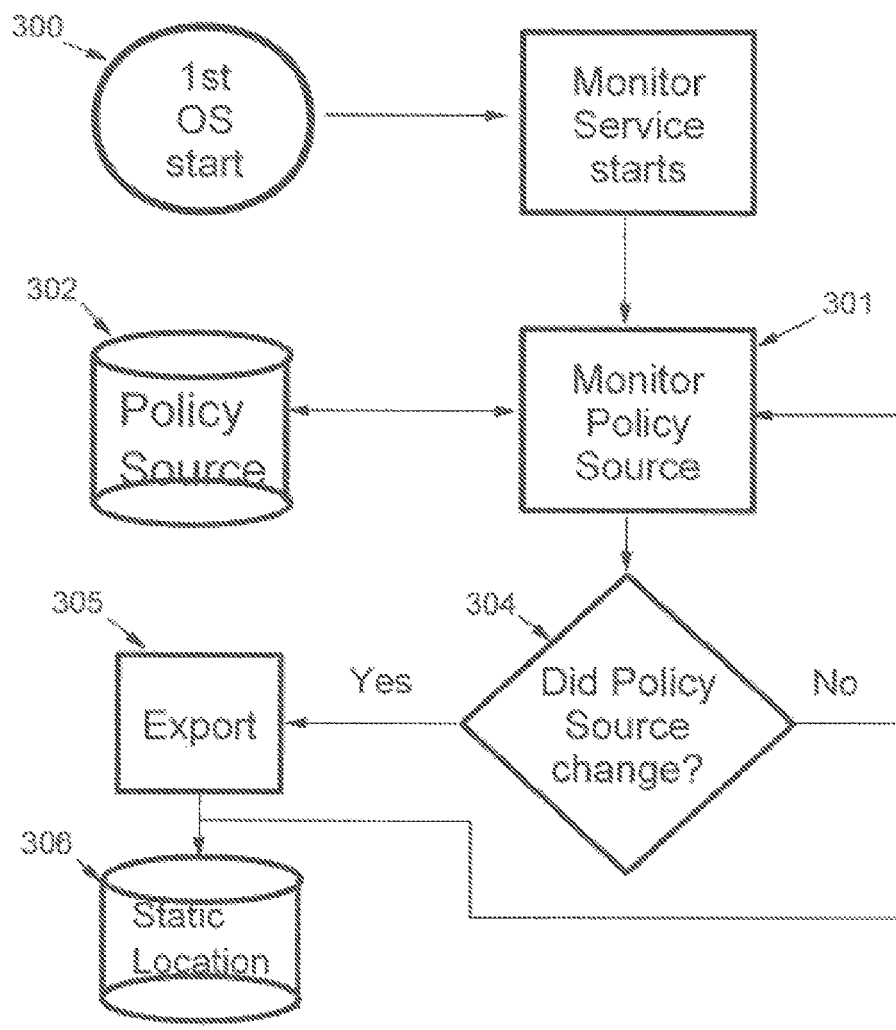
FIG. 3 is a schematic flow diagram of a sequence of events occurring during execution of a first operating system.
Figure 4:
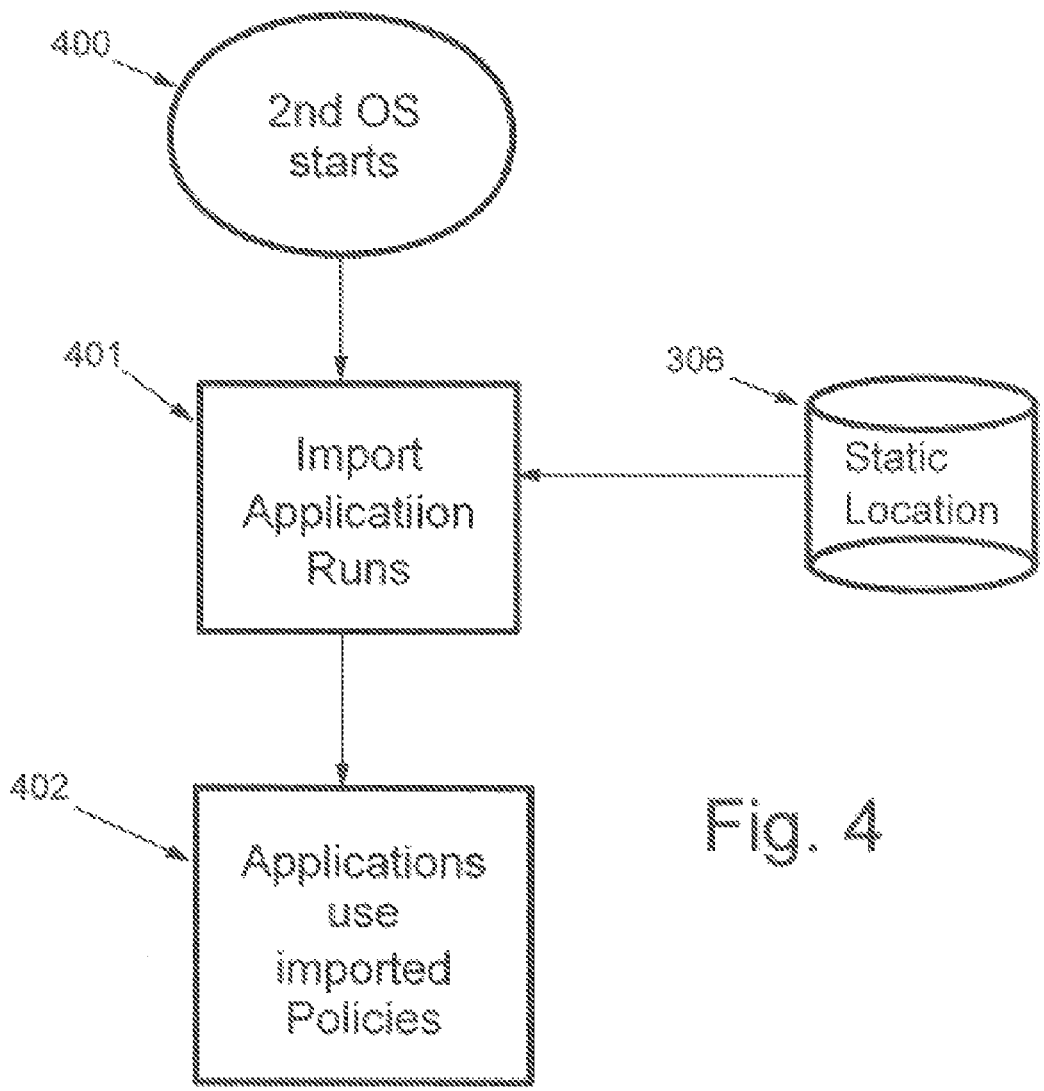
FIG. 4 is a schematic flow diagram of a sequence of events occurring during execution of a second operating system.

These specific, non-limiting, sequences are illustrated in FIGS. 3 and 4. In FIG. 3, the first operating system begins execution at 300 and the monitoring and exporting service begins execution at 301. The service monitors the policy source data stored, for example, at 302 in the system hard drive. Should the service find that the policy source has changed, at step 304, then the export function is triggered and the policy source data is exported, at step 305, to a static location 306. If the policy source data has not changed, then the service loops back to continue monitoring. In FIG. 4, when the second operating system initiates at 400, the first executing application is the importation application at 401. The importation application accesses the policy source data from the static location 306 and subsequently executing applications then use the imported data 402.

Thus the computer system, when operating under the control of the first operating system which stores policy source data identifying configuration settings, exports policy source data to and stores the exported policy source data in a predetermined location in digital memory. Upon transfer of control over operation of the computer system to the second operating system, under defined circumstances, the stored policy source data is imported from the predetermined location into the second operating system. The exporting and storing preferably includes casting the policy source data into a predefined data format which may be different from the format used by the first operating system and placing the policy source data in a location hidden from access by a user of the computer system and accessible to the second operating system. Preferably, that placement puts the data on a hard disk drive accessible to the second operating system.

Figure 5:
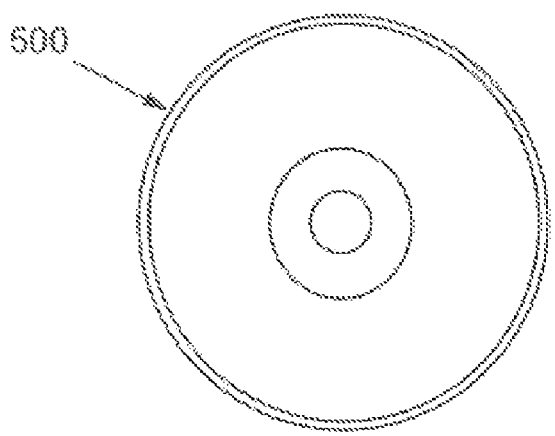
FIG. 5 is a representation of a computer readable medium with code stored thereon which, when executing on a central processor, implements the present invention.

The present invention is implemented in a computer system such as system 10 of FIG. 1 by the execution of code. It is contemplated that the code necessary to implementation of the invention is made available to a central processor through being stored on a computer readable medium. That medium may be an optical disk such as a CD ROM (see 400 in FIG. 5) for initial distribution as a program product, a hard disk drive such as the disk drive 200 shown in FIG. 1 for implementation during normal system use, or some other storage medium such as a flash drive or hard disk not shown in the Figures and accessed through the I/O controller 70 or over a network through the network adapter 66 of FIG. 1.

In the drawings and specifications there has been set forth a preferred embodiment of the invention and, although specific terms are used, the description thus given uses terminology in a generic and descriptive sense only and not for purposes of limitation.

What we claimed is:

1. Apparatus comprising:
   a computer system having a central processor unit and digital memory operatively associated with said central processing unit;
   a first operating system stored accessibly to said central processing unit and effective when executing on said central processing unit to store in said digital memory policy source data in a predetermined data format that is different from a data format used by the first operating system, the stored policy source data identifying, to at least one application program executing on the central processing unit system resources that are needed for execution of the at least one application program on the first operating system:
   a program element effective when executing under said first operating system to monitor stored policy source data and export monitored policy source data to storage in a predetermined location in said digital memory;
   a second operating system stored accessibly to said central processing unit and called to control said central processing unit under defined circumstances as an alternate to said first operating system; and
   a second program element effective when operating under said second operating system to access said policy source data stored in said predetermined location, the stored policy source data to enable an execution of the at least one application while the system is under the control of the second operating system.

2. Apparatus according to claim 1 wherein said exported policy source data is stored in the predetermined data format by casting the policy source data into the predetermined data format.

3. Apparatus according to claim 1 wherein said predetermined location in said digital memory is a location hidden from a user of the apparatus.

4. Apparatus according to claim 3 wherein said digital memory comprises a hard disk device and the hidden location is located on the hard disk device.

5. Apparatus according to claim 1 wherein said policy source data is at least one registry data file enabling the at least one application executing under the first operating system to execute under the second operating system.

6. Apparatus according to claim 5 wherein said program element executing under said first operating system comprises a service effective when executing to monitor and export said registry data.

7. Apparatus according to claim 5 wherein said second program element executing under said second operating system comprises an application effective when executing to import said registry data to be used by other applications executing under said second operating system.

8. A method to assure that at least one application that functions under a first operating system also functions under a second operating system, comprising:
   operating a computer system under the control of a first operating system which stores policy source data identifying to at least one application program executing on the computer system resources that are needed for execution of the at least one application program on the first operating system;
   exporting the policy source data to and storing the exported policy source data in a predetermined location in a digital memory in a predetermined data format that is different from a data format used by the first operating system;
   transferring control over operation of the computer system to a second operating system under defined circumstances; and
   importing the stored policy source data from the predetermined location into the second operating system to enable an execution of the at least one application while the system is under the control of the second operating system.

9. Method according to claim 8 wherein the exporting comprises casting the policy source data into a the predetermined data format.

10. Method according to claim 8 wherein the exporting and storing comprises placing the policy source data in a location hidden from access by a user of the computer system and accessible to the second operating system.

11. Method according to claim 10 wherein the exporting and storing comprises placing the policy source data on a hard drive operatively associated with the first and second operating systems.

12. Method according to claim 8 wherein, during operation of the computer system under the first operating system, a service executes which accomplishes the exporting and storing of policy source data.

13. Method according to claim 8 wherein the importing of the policy source data proceeds prior to the initiation of any application executing under the second operating system.

14. Method according to claim 8 wherein the policy source data is at least one registry data file enabling the at least one application executing under the first operating system to execute under the second operating system.

15. An article of manufacture, comprising:
   a computer readable medium;
   computer executable code stored on said medium which, when executing in a computer system having a central processor and a memory,
      executes a first operating system to control the operation of the computer system and implement policy source data identifying to at least one application program executing on the computer system resources that are needed for execution of the at least one application program on the first operating system;
      exports the policy source data to and stores the exported policy source data in a predetermined location in the memory in a predetermined data format that is different from a data format used by the first operating system;
      transfers control over operation of the computer system to a second operating system under defined circumstances; and
      imports the stored policy source data from the predetermined location into the second operating system to enable an execution of the at least one application while the system is under the control of the second operating system.

16. The article of manufacture according to claim 15 wherein the export of the policy source data casts the policy source data in a the predetermined data format.

17. The article of manufacture according to claim 15 wherein the export and storing of policy source data places the policy source data in a location hidden from access by a user of the computer system and accessible to the second operating system.

18. The article of manufacture according to claim 17 wherein the export and storing of policy data places the policy source data on a hard drive operatively associated with the first and second operating systems.

19. The article of manufacture according to claim 15 wherein, during operation of the computer system under the control of the first operating system, a service executes which accomplishes the export and storing of policy source data.

20. The article of manufacture according to claim 15 wherein the import of the policy source data proceeds prior to the initiation of any application executing under the second operating system.

21. The article of manufacture according to claim 15 wherein the policy source data is at least one registry data file enabling the at least one application executing under the first operating system to execute under the second operating system.

* * * * *